United States Patent
Honma

[11] Patent Number: 5,955,660
[45] Date of Patent: Sep. 21, 1999

[54] METHOD OF CONTROLLING PROBE MICROSCOPE

[75] Inventor: Akihiko Honma, Chiba, Japan

[73] Assignee: Seiko Instruments Inc., Japan

[21] Appl. No.: 08/763,674

[22] Filed: Dec. 6, 1996

[51] Int. Cl.[6] .................................................. G01B 11/30
[52] U.S. Cl. .......................................... 73/105; 250/307
[58] Field of Search ............................ 73/105; 250/306, 250/307

[56] References Cited

U.S. PATENT DOCUMENTS

| | | | |
|---|---|---|---|
| 5,166,516 | 11/1992 | Kajimura | 250/307 X |
| 5,206,702 | 4/1993 | Kato et al. | 250/306 X |
| 5,253,516 | 10/1993 | Elings et al. | 73/105 |
| 5,274,230 | 12/1993 | Kajimura et al. | 250/307 X |
| 5,294,804 | 3/1994 | Kajimura | 250/306 X |
| 5,400,647 | 3/1995 | Elings | 73/105 |
| 5,408,094 | 4/1995 | Kajimura | 250/306 X |
| 5,412,980 | 5/1995 | Elings et al. | 73/105 |
| 5,464,977 | 11/1995 | Nakagiri et al. | 250/306 X |
| 5,537,372 | 7/1996 | Albrecht et al. | 250/306 X |
| 5,675,154 | 10/1997 | Lindsay et al. | 250/306 X |

OTHER PUBLICATIONS

*Patent Abstracts of Japan* Grp P1803, vol. 18, No. 505 Abs pub date Sep. 21, 1994 (6–174459) Inter–Atomic Force Microscope.

*Patent Abstracts of Japan* (8–313542) Nov. 29, 1996 "Scanning Probe Microscope".

*Primary Examiner*—Thomas P. Noland
*Attorney, Agent, or Firm*—Adam & Wilks

[57] ABSTRACT

An improved stable feedback control circuit for a scanning probe microscope has a vibrationally driven cantilever having a probe mounted at a distal end thereof at a frequency near the resonance frequency thereof and a light detector for measuring deflection of the cantilever in response to a repulsive force acting between the probe and a surface of a sample and producing a pair of output signals which vary depending upon deflection of the cantilever and a detected signal having the vibrating frequency of the cantilever as a fundamental frequency component thereof, a method for controlling the probe microscope comprising the steps of: producing a plurality of input signals for the feedback control circuit comprising a first input signal equivalent to the root-mean-square value of the detected signal and a second input signal equivalent to a difference between, or the sum of, the pair of output signals of the light detector, and adding the first and second input signals to produce a feedback control signal used for maintaining a constant distance between the probe and the sample surface.

6 Claims, 2 Drawing Sheets

METHOD OF CONTROLLING PROBE MICROSCOPE

The present invention relates to a circuit for feedback-controlling a probe in the vertical axis direction in scanning probe microscopes, and also in instruments for analysis and measuring instruments which operate under the same theory as the scanning probe microscope.

In a scanning probe microscope, a probe is scanned on a surface of a sample approaching 1 nm or less to the surface of the sample being monitored. The probe is feedback-controlled in a vertical direction with respect to the surface of the sample so as to keep a constant space between the probe and the surface of the sample. There are various methods in the prior art for providing the feedback-control.

In the scanning probe microscope, a method is well known for controlling and measuring in a non-contact type interatomic force microscope, that is, one in which the condition of non-contact between the probe and the plane of the sample is maintained, in which a cantilever is excited near its resonance frequency and deflection of the cantilever is measured by monitoring the amplitude change of a detected signal having the exciting frequency as a fundamental.

More specifically, as shown in FIG. 2, a laser light radiated from a laser radiation portion 23 irradiates an upper portion of a cantilever 26. A change in the optical path of reflected light equivalent to deflection of the cantilever 26 is detected as a change of laser spot position on the plane of a light detector 24 divided in two at the detecting plane thereof to produce change of position detecting signals P1 and P2. An oscillator 27 and piezo-electric element 25 for excitation are used in order to keep the cantilever 26 vibrating at a frequency near its resonance frequency. Resonance frequency of cantilever 26 is selected in the range 50 kHz to 300 kHz. Position detecting signals P1 and P2 are amplified by a differential amplifier 29, which outputs a differential signal S7 equivalent to P1–P2. Although differential signal S7 is a signal having the exciting frequency as a fundamental, the root-mean-square value of the alternating current component of differential signal S7 is detected in r.m.s. value detector 30 as an amplitude change of the fundamental and is equivalent to deflection of the cantilever. Lowpass filter 31 is set in order to cut out the high frequency component having the excitation frequency as a fundamental, that is, the high frequency component from the signal detected by the root-mean-square value detector 30.

Control input signal S8 output from the lowpass filter 31 is compared with the output value of a set point setting portion 34, which generates a predetermined set point value for cantilever deflection, in a comparator 32, and the comparison value goes through a PI controller 33, and is amplified in voltage by a piezo-electric driving amplifier 37 to drive piezo-electric element 28 for scanning a sample 22 relative to a probe 21 provided at the distal end of the cantilever 26. In the prior art method, the distance between probe 21 and sample 22 is controlled with non-contact between the two elements by a feedback control circuit having the above-mentioned construction.

In such prior art, an extremely close approach or actual contact between the probe and the sample severely attenuates the fundamental, or excitation frequency, and feedback control becomes unstable because amplitude change by only the fundamental of excitation frequency is used as the control input signal for feedback control. In this case, the attenuation of the control input signal for feedback control makes it for a time impossible, or, at best, unstable to control the probe because the noise level of the feedback control system relatively increases by virtue of the attenuation of the control input signal and the S/N ratio becomes low.

In a scanning probe microscope, during high speed scanning or scanning on a plane of a sample having a steep surface shape there is a great probability of extremely close approach or contact with a little repulsion between the probe and the sample. In the prior art, turbulence of monitoring figure signal gained from a control signal occurs, and fidelity or repeatability of the monitoring figure is spoiled because the feedback control system becomes impossible or unstable to control in this case.

Further, in order to avoid these phenomena with said prior art, the scanning speed has to be set slow, which lowers performance of the instrument in this case.

SUMMARY OF THE INVENTION

The present invention uses additional signals for feedback control of the probe, such as a signal equivalent to a difference signal of the light detector outputs or, for example, a signal equivalent to the sum of the light detector outputs.

As a result of the use of additional signals in the feedback control circuitry of the scanning probe microscope, the accuracy of the microscope is improved and the scanning speed may be increased without degrading the S/N ratio of the device. Although a signal equivalent to a difference signal of the light detector outputs includes a fundamental equal to the excitation frequency, a low frequency element of the signal is the control signal in, what is commonly called, a non-contact interatomic force microscope, and a signal which is stable and changing almost linearly in accordance with repulsion between the probe tip and sample surface is received even in a state of extremely close approach between the probe tip and sample. Therefore, in feedback control when the probe is away from the sample, the amplitude change in the fundamental or excitation frequency dominates the control input signal by adding the signal to the control input signal. In feedback control when the probe comes extremely close to the sample or contacts it, the contribution of the signal equivalent to the differential signal of the light detector dominates as the control input signal.

Next, although a signal equivalent to the sum of the light detector outputs includes the fundamental or excitation frequency, the low frequency element of the signal changes when the probe contacts the sample and much repulsion occurs. Therefore, in feedback control when the probe is far away from the sample, the amplitude change in the fundamental or excitation frequency dominates as the control input signal by adding the signal to the control input signal. In feedback control when the probe contacts the sample, the contribution of the signal equivalent to the sum of the light detector ouatputs dominates as the control input signal.

The present invention thus solves the conventional problems using the following signals as the control input signal of feedback control of the probe: a signal in which the amplitude changes in accordance with changes in the fundamental or excitation frequency and a signal equivalent to the difference of the light detector outputs; a signal in which the amplitude changes in accordance with changes in the fundamental or excitation frequency, a signal equivalent to the difference of the light detector outputs and a signal equivalent to the sum of the light detector outputs.

DETAILED DESCRIPTION OF THE PREFERRED EMBODIMENTS

Figure 1:
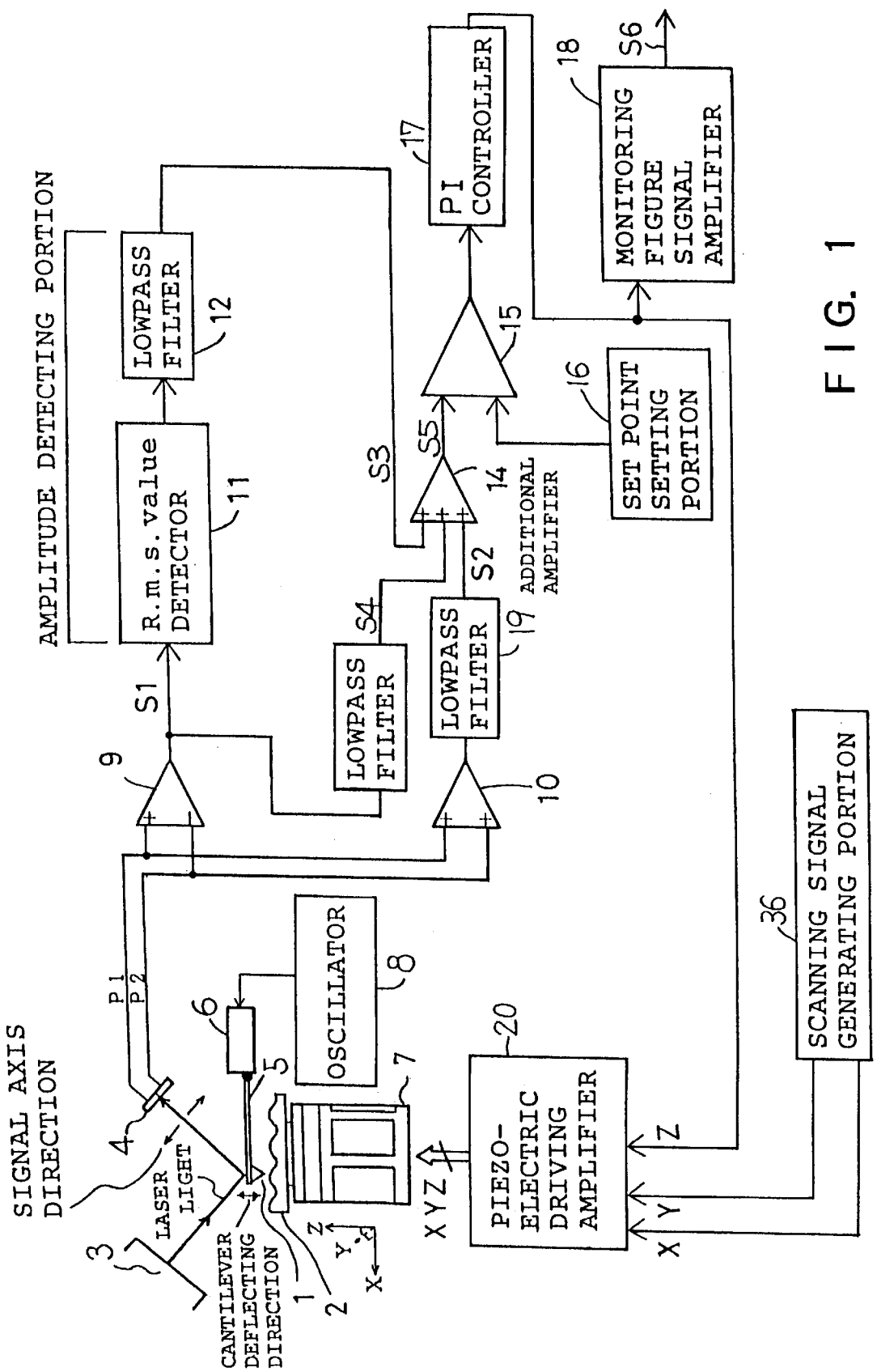
FIG. 1 is a block diagram showing a control method of a probe microscope of the present invention.
Figure 2:
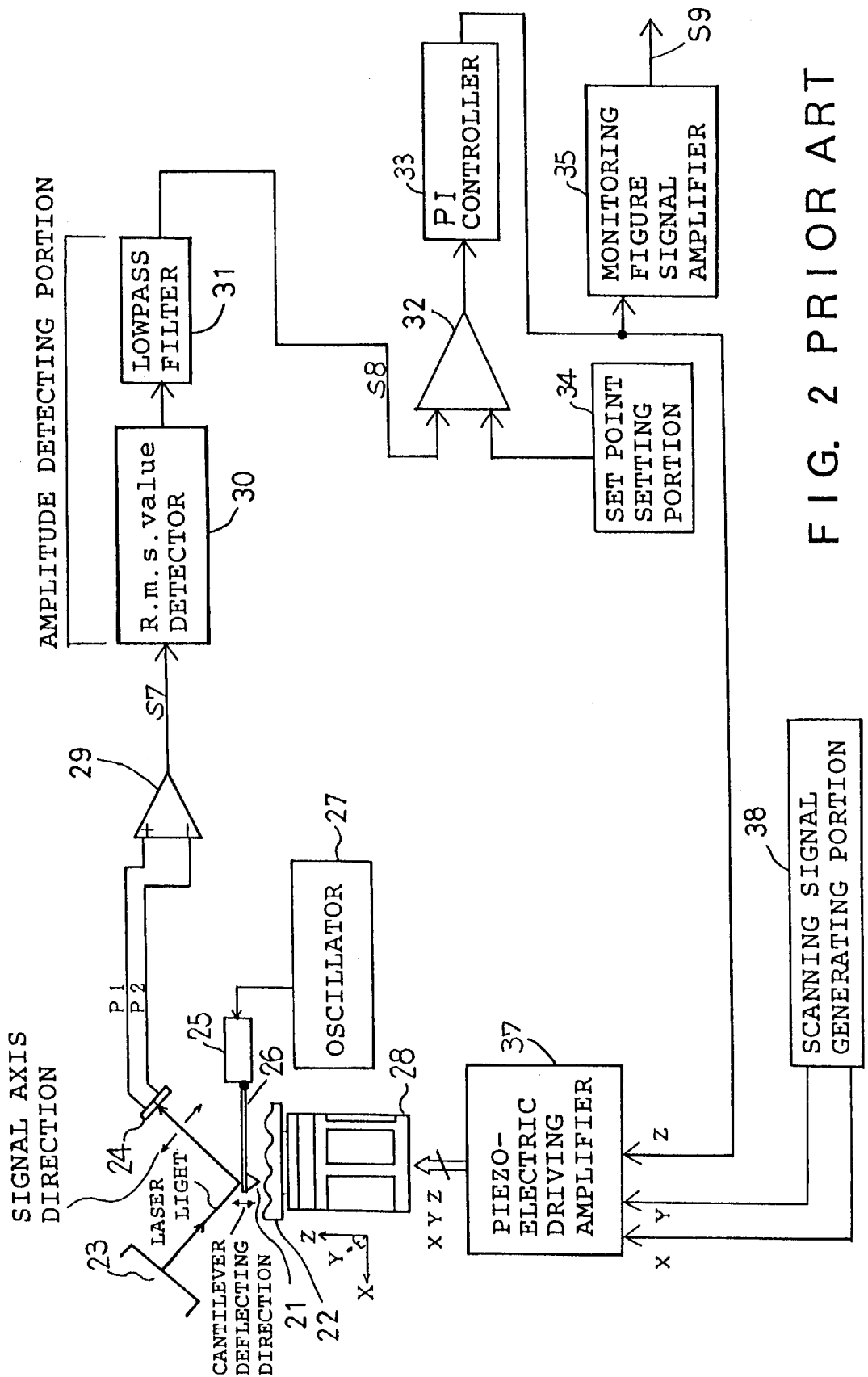
FIG. 2 is a block diagram showing a prior art control method of a probe microscope.

Referring to FIG. 1, embodiments of the present invention are described below.

In FIG. 1, laser light radiated from a laser radiating portion 3 irradiates an upper portion of a cantilever 5. A change of optical path of reflected light equivalent to the deflection of the cantilever 5 is detected as a change of laser spot position on the plane of a light detector 4 divided in two at the detecting plane thereof to produce change of position detecting signals P1 and P2. An oscillator 8 and piezo-electric element 6 for excitation are used in order to maintain cantilever vibrating at a frequency near its resonance frequency. Resonance frequency of cantilever 5 is selected to be in the range 50 kHz to 300 kHz. Position detecting signals P1 and P2 are amplified by a differential amplifier 9, which outputs a difference signal S1 equivalent to P1–P2. Although difference signal S1 is a signal having the excitation frequency of the cantilever as a fundamental component, the root-mean-square value of the alternating current component of difference signal S1 is detected in an r.m.s. value detector 11 as an amplitude change of the fundamental and is equivalent to deflection of the cantilever. Lowpass filter 12 is set in order to cut out the high frequency component of the excitation frequency as a fundamental, that is, the high frequency component from the signal detected by root-mean-square value detector 11.

Lowpass filter 13 is set in order to cut out the frequency component having the excitation frequency as a fundamental, that is, the high frequency component from the difference signal S1. The output of lowpass filter 13 becomes differential signal S4. Further, position detecting signals P1 and P2 are amplified by additional amplifier 10, and, in the same way, a value equivalent to the sum of these signals S2 is obtained, that is, P1+P2, after passing the sum through a lowpass filter 19 for cutting out the high frequency element.

Detected signal S3 output by lowpass filler 12 by said signal detected with root-mean-square value, difference signal S4, and summation signal S2 are added in a summing amplifier 14, and the output thereof becomes control input signal S5 used for feedback control at the probe. Here, the result of addition in summing amplifier 14 is expressed below in expression (1).

$$S5 = A \times S3 + B \times S4 + C \times S2 \tag{1}$$

Value of each factor A, B, and C in expression (1) determines addition rate and polarity of detected signal S3, differential signal S4, and additional signal S2 considering stability of feedback control system. The factors are adjusted for use depending on switch of said non-contact type inter-atomic force microscope and contact type, and measurement conditions by kinds of monitored samples.

Control input signal S5 obtained by the above-described process is compared with the output of a set point setting portion 16 which generates a predetermined set point of deflection of the cantilever 5, and the comparison result goes through a PI controller 17 and the output thereof is amplified in voltage by a piezo-electric driving amplifier 20 in order to drive piezo-electric element 7 for scanning.

Scanning signal generating portion 36 is a portion generating scanning signal to in-plane-scan probe 1 relatively on the surface of sample 2. While in-plane-scanning, output signal of PI controller 17 is amplified to the most suitable signal level in monitoring figure signal amplifier 18, and becomes monitoring figure signal S6.

In the present invention, the following phenomena can be avoided: extreme approach or contact between the probe and the sample extremely attenuates the fundamental or excitation frequency, and feedback control becomes unstable; and attenuation of the control input signal of feedback control makes time impossible to control. S/N ratio and stability of feedback control system are possible to improve. Monitoring figure can be gained in shorter time because high speed scanning is possible as compared with the prior art, and fidelity and repeatability of monitoring figure rise when monitoring a sample having a complex, steep surface shape that has been difficult to measure in the past.

The present invention makes it possible to construct said non-contact type interatomic force microscope and contact type in one instrument and to change instantly each of them while measuring. Concretely, as the present invention is non-contact type construction, it is able to change to contact type by setting value of factor A in said expression (1) at zero. Thus, the present invention is able to gain two kinds of monitoring figures changing both instantly in every one scan of in-plane-scanning when a sample is monitored because it is easy to change a non-contact type interatomic force microscope and a contact type.

What is claimed is:

1. In a feedback control circuit of a scanning probe microscope having means for vibrating a cantilever having a probe mounted at a distal end thereof at a frequency near the resonance frequency of the cantilever and a light detector for measuring deflection of the cantilever in response to a repulsive force acting between the probe and a surface of a sample and producing a pair of output signals which vary depending upon deflection of the cantilever and a detected signal having the vibrating frequency of the cantilever as a fundamental frequency component, a method for controlling the probe microscope comprising the steps of: producing a plurality of input signals for the feedback control circuit comprising a first input signal equivalent to the root-mean-square value of the detected signal and a second input signal equivalent to a difference between the pair of output signals of the light detector; and adding the first and second input signals to produce a feedback control signal used for maintaining a constant distance between the probe and the sample surface.

2. In a feedback control circuit of a scanning probe microscope having means for vibrating a cantilever having a probe mounted at a distal end thereof at a frequency near the resonance frequency of the cantilever and a light detector for measuring deflection of the cantilever in response to a repulsive force acting between the probe and a surface of a sample and producing a pair of output signals which vary depending upon deflection of the cantilever and a detected signal having the vibrating frequency of the cantilever as a fundamental frequency component, a method for controlling the probe microscope comprising the steps of: producing a plurality of input signals for the feedback control circuit comprising a first input signal equivalent to the root-mean-square value of the detected signal and a second input signal equivalent to the sum of the pair of outputs of the light detector; and adding the first and second input signals to produce a feedback control signal used for maintaining a constant distance between the probe and the sample surface.

3. In a feedback control circuit of a scanning probe microscope having means for vibrating a cantilever having a probe mounted at a distal end thereof at a frequency near the resonance frequency of the cantilever and a light detector for measuring deflection of the cantilever in response to a repulsive force acting between the probe and a surface of a sample and producing a pair of output signals which vary depending upon deflection of the cantilever and a detected signal having the vibrating frequency of the cantilever as a fundamental frequency component, a method for controlling the probe microscope comprising the steps of producing a plurality of input signals for the feedback control circuit comprising a first input signal equivalent to the root-mean-square value of the detected signal, a second input signal equivalent to the difference in the pair of outputs of the light detector detector, and a third input signal equivalent ot the sum of the pair of outputs of the light device; and adding the first, second and third input signals to produce a feedback control signal used for maintaining a constant distance between the probe and the sample surface.

4. A method for controlling a probe microscope according to claim 1; further comprising the steps of setting a first multiplying factor for weighting of the first input signal and a second multiplying factor for weighting of the second input signal; and setting the polarity of the first and second input signals; wherein the multiplying factors and polarity of the first and second input signal are determined based upon whether a contact or non-contact type measurement is being conducted and depending upon the surface of the sample.

5. A method for controlling a probe microscope according to claim 2; further comprising the steps of setting a first multiplying factor for weighting of the first input signal and a second multiplying factor for weighting of the second input signal; and setting the polarity of the first and second input signals; wherein the multiplying factors and polarity of the first and second input signals are determined based upon whether a contact or non-contact type measurement is being conducted and depending upon the surface of the sample.

6. A method for controlling a probe microscope according to claim 3; further comprising the steps of setting a first multiplying factor for weighting of the first input signal a second multiplying factor for weighting of the second input signal, and a third multiplying factor for weighing of the third input signal; and setting the polarity of the first through third input signals; wherein the multiplying factors and polarity of the first through third input signals are determined based upon whether a contact or non-contact type measurement is being conducted and depending upon the surface of the sample.

* * * * *